(12) United States Patent
Jung et al.

(10) Patent No.: US 7,824,600 B2
(45) Date of Patent: Nov. 2, 2010

(54) BIAXIALLY ORIENTED POLYOLEFING FILM HAVING IMPROVED SURFACE PROPERTIES

(75) Inventors: Joachim Jung, Neunkirchen (DE); Thomas Gottfreund, St. Ingbert (DE)

(73) Assignee: Treofan Germany GmbH & Co. KG, Neunkirchen (DE)

( * ) Notice: Subject to any disclaimer, the term of this patent is extended or adjusted under 35 U.S.C. 154(b) by 0 days.

(21) Appl. No.: 12/092,649

(22) PCT Filed: Oct. 31, 2006

(86) PCT No.: PCT/EP2006/067973

§ 371 (c)(1), (2), (4) Date: May 5, 2008

(87) PCT Pub. No.: WO2007/051797

PCT Pub. Date: May 10, 2007

(65) Prior Publication Data

US 2008/0237935 A1    Oct. 2, 2008

(30) Foreign Application Priority Data

Nov. 3, 2005    (DE) .................. 10 2005 052 441

(51) Int. Cl.
- *B29C 59/16* (2006.01)
- *H05H 1/26* (2006.01)
- *D02J 1/22* (2006.01)

(52) U.S. Cl. .............. 264/448; 264/455; 264/469; 264/479; 264/483; 264/80; 264/288.4; 264/289.3; 264/290.2; 156/229; 156/494; 156/496; 427/533; 427/535; 427/536; 427/539; 427/569; 427/570

(58) Field of Classification Search .......... 264/289, 264/483
See application file for complete search history.

(56) References Cited

U.S. PATENT DOCUMENTS

| 3,433,777 A | 3/1969 | Matsumoto et al. |
| 4,198,327 A | 4/1980 | Matsumoto et al. |
| 4,239,973 A | 12/1980 | Kolbe et al. |
| 5,147,678 A * | 9/1992 | Foerch et al. ............... 427/562 |
| 5,476,899 A * | 12/1995 | Funaki et al. ............... 524/577 |
| 5,837,958 A | 11/1998 | Förnsel |
| 6,217,687 B1 * | 4/2001 | Shibata et al. ............... 156/82 |
| 6,503,989 B1 * | 1/2003 | Hruska ................... 525/333.7 |
| 6,964,814 B2 * | 11/2005 | Fujii et al. ............... 428/423.1 |
| 2001/0052383 A1 * | 12/2001 | Buske et al. ................ 156/229 |
| 2003/0104125 A1 * | 6/2003 | Busch et al. ............. 427/207.1 |
| 2005/0096431 A1 * | 5/2005 | Fujii et al. ................... 525/178 |
| 2007/0036909 A1 * | 2/2007 | Luo et al. ................... 427/532 |

FOREIGN PATENT DOCUMENTS

| DE | 2753750 A1 | 6/1979 |
| DE | 19532412 A1 | 3/1997 |
| EP | 0947544 A2 | 10/1999 |
| EP | 1282508 B | 2/2003 |
| JP | 2000001554 | 1/2000 |
| JP | 2001089590 | 4/2001 |
| WO | WO-01/85447 A1 | 11/2001 |

* cited by examiner

*Primary Examiner*—Jeffrey Wollschlager
(74) *Attorney, Agent, or Firm*—Connolly Bove Lodge & Hutz LLP

(57) ABSTRACT

The invention relates to a method for raising the surface tension of biaxially-stretched films made of thermoplastic polymers. According to the method, a film is first treated on a surface by means of an atmospheric pressure plasma before being stretched transversally or simultaneously across the width thereof, and the film is additional a subjected to a second treatment by means of a corona or flame after being stretched transversally or simultaneously, the second treatment being done on the same surface which has already been plasma-treated.

6 Claims, No Drawings

BIAXIALLY ORIENTED POLYOLEFING FILM HAVING IMPROVED SURFACE PROPERTIES

CROSS-REFERENCE TO RELATED APPLICATIONS

This application is a national stage application (under 35 U.S.C. 371) of PCT/EP2006/067973 filed Oct. 31, 2006, which claims benefit to German application 10 2005 052 441.9 filed Nov. 3, 2005.

BACKGROUND OF THE INVENTION

The invention concerns a biaxial-oriented polyolefin film with improved surface properties, as well as a procedure for manufacturing these films, and its use.

In the plastic treatment industry, in particular in the film branch, surface treatment by means of various pre-treatment methods like e.g. electrical corona discharge, flame or plasma have been part of the prior art for years. These procedures are put to use in order to raise the surface tension, in order to improve metallisability and printability, or rather to increase the compound strength of laminates or adhesive strength of coatings. In corona treatment, a sheet of film is fed over an electrically-earthed support surface, for example a roller. A counter electrode is arranged over this roller at a distance of a few millimeters from the roller. By the application of a mid- to high-frequency AC current, the electrons emitted by the counter electrode ionise the air in the gap between roller and counter electrode. The ions are accelerated by the electric field in the direction of the roller electrode and release their charges and energy onto the film surface. As a result of this bombardment, fragmentation reactions like e.g. separations or chain scissions are initiated. Highly reactive positions in the surface arise, which could react with the reaction products of the corona discharge or could be constituents of the surrounding atmosphere.

These kinds of reactive species can also be generated by other physical procedures, for example by a hot flame (flame treatment) or by discharge procedures in a controlled atmosphere ($N_2$, $O_2$ or Argon) at reduced pressure (low pressure plasma). Most recently, procedures have also been developed in which the plasma is generated e.g. in a nozzle with gas throughflow, and a plasma treatment can be carried out on the substrate surface at atmospheric pressure by alignment of these nozzles.

What all of these procedures have in common is that, by exposure to the reactive species generated, the polymer surface is modified and features improved adhesive properties in the subsequent procedural steps. Procedures working according to this basic principle, as well as devices for carrying out this procedure, are described very extensively with all of their advantages and disadvantages in C. Franz, Kalte Plasmen, Grundlagen, Erscheinungen, Anwendungen, Springer, Berlin 1990 and in A. Grill, Cold Plasma in Materials fabrication from Fundamentals to Application, IEEE Press, N.Y., 1994 and in H. Yasuda, Plasma Polymerization, Academic Press, London, 1985 and in H. Drost, Plasmachemie, Prozesse der chemischen Stoffumwandlung unter Plasmabedingungen, Akademie-Verlag, Berlin, 1978 as well as in the DE-A-27 53 750 (=EP-B-0 002 453, U.S. Pat. No. 4,239,973).

The known procedures have preserved themselves for the raising of the surface tension of films. The activation of the surfaces of films is carried out alternatively in-line, i.e. in the manufacture of the film, or directly before the particular processing step which requires a high surface tension, like e.g. printing, metallisation, lamination. To this end, processors have integrated corresponding pre-treatment stations into their devices. For in-line treatment, the pretreatment stations are integrated into the device for the manufacture of the film, in order to carry out the pre-treatment during the actual film manufacture. Conventionally, they are to be found in the so-called run-out, in order to subject the film to a corresponding treatment after the biaxial stretching and after the heat setting but finally before coiling.

The desired activating effect of a surface treatment is measurable as surface tension of the film. Conventionally, this value for an untreated polypropylene film lies in the range from 27 to 30 mN/m. The surface tension can be raised to 40 to 44 mN/m by corona treatment. This activation of the surface is, however, not boundlessly stable over time. The surface tension of the treated film declines over several weeks, so that after a few months values of 36 to 38 mN/m are obtained, i.e. until treatment of the film comes around the values are so low that before printing, metallisation of other corresponding procedural steps a renewed surface treatment must take place, in order to ensure the desired good adhesive strength. Despite this "refreshment" by a renewed corona or flame treatment, the original maximum values are no longer obtained. Correspondingly, the adhesive properties of these films, or rather the adhesive properties achieved by these procedures, are in need of improvement. According to the composition of the films, these kinds of "refreshments" are sometimes no longer at all possible, or rather lead to undesired side effects due to the ingredients of the films.

The decline of the pre-treatment cannot be improved by higher, i.e. more intensive, in-line pre-treatments as per the prior art, A too-high or too-long pre-treatment damages the film surface, e.g. by mechanical surface roughening or erosion of the surface, and an additionally undesired pre-treatment of the film reverse side (reverse side effect) can come about. Furthermore, high treatment intensities generate an unacceptable characteristic smell (Maggi), which negatively influences the organoleptic properties. Moreover, is was established that higher output values of the surface tension decline comparatively even faster, so that, overall, longer storage times are not possible between manufacture and further treatment.

The retention of the surface tension depends critically on the type of polymers which are subjected to the surface treatment. So, mixed polymerisates, which are made up of various monomers, basically have a longer retention, whereas in homopolymers, in particular propylene homopolymers, the values have already declined so far after three months that the adhesive properties are insufficient. For this reason modifications of the top layer are suggested for the improvement of the adhesive properties.

EP 1282508 describes a modification by a special surface layer of polyolefinic polymers, which contain at least 50% by weight, relative to the weight of the layer, of a maleic acid anhydride modified polyolefin. For the improvement of the adhesive properties, the film is surface treated during manufacture by means of corona or flame after the biaxial stretching. This surface treatment generally declines over time, but when, before the printing, metallisation of lamination a "refreshment" is carried out, the initial values are obtained again because of the modification of the top layer polymers with maleic acid anhydride, whereas with conventional sealing layer or with top layers made of homopolymers at best 80% of the original surface tension is obtained. According to the description in EP 1282508, the second treatment step takes place off-line, i.e. after the manufacture of and storage of the film directly before the further treatment.

Alongside the decomposition of the activated effect over time it is also known that the effect of the surface treatment by raised temperatures is lost. For example, the surface tension of a polypropylene film plasma-treated by means of lower pressure is reduced from 72 to <28 mN/m, if the film is exposed to a temperature of over 130° C. for a few minutes after pre-treatment. This effect prevents a film from being able to be in-line treated before orientation, as this orientation is only possible in the longitudinal and lateral direction at a raised temperature. In practice, for this reason all pre-treatment devices are integrated into the manufacturing devices in such a way that the surface treatment takes place after the biaxial orientation.

BRIEF SUMMARY OF THE INVENTION

So, underlying the present invention is the task of creating a procedure for surface treatment of biaxially-oriented or monoaxially-oriented films, through which the film surface becomes activated and the films also show good adhesive properties in the procedure for further treatment after conventional storage times of more than 6 months. The film should be able to be manufactured economically and inexpensively. The required usage properties of the film remaining may not thereby be adversely affected.

This task is solved by a procedure for the surface treatment of a biaxially-stretched film, which, after longitudinal stretching and before lateral stretching, is treated over its width by means of atmospheric pressure plasma and, after the lateral stretching and before coiling, is additionally subjected to a second treatment by means of corona or flame.

The task is furthermore solved by a procedure for raising the surface tension of biaxially-stretched films made of thermoplastic polymers, the stretching of which is carried out simultaneously, such that the film is treated on one surface over its width by means of atmospheric pressure plasma before the simultaneous stretching, and additionally subjected to a second treatment by means of corona or flame after the simultaneous stretching and before the coiling, whereby this second treatment is carried out on the same surface already treated with plasma. The subordinate claims give preferred embodiments of the invention.

DETAILED DESCRIPTION OF THE INVENTION

Within the scope of the investigations for the present invention it was found that a surface treatment, also a plasma treatment, which is carried out before the orientation of the film remains without effect in the final analysis. Now, very high values of over 56 mN/m can be achieved initially by the plasma, after the orientation, however, these values are hardly any higher than those of the untreated films. Surprisingly, by combination of a plasma treatment (atmospheric plasma) before the lateral stretching and a corona or flame treatment, high and stable values for the surface tension can be achieved which cannot be achieved by an individual treatment step alone or only achieved by acceptance of other severe disadvantages.

Although the plasma treatment before the lateral stretching shows almost no effect, as the high temperature in the lateral stretching destroys the whole original effect, the plasma treatment works differently in combination with the corona or the flame and leads to values which are not technically achievable by a corona treatment alone.

The plasma treatment, flame treatment and the corona treatment are known in themselves in the prior art and are combined according to the invention in such a way that the plasma treatment takes place after the stretching of the film in the longitudinal direction, but before the lateral stretching and the corona or flame treatment after the lateral stretching of the film. In particular, the devices for plasma treatment are positioned in such a way that the film has left the stretching unit for the longitudinal stretching, i.e. the fast-running stretching roller. The film is thereafter fed over a temperable roller, over which the plasma nozzles are arranged. Differently suited film temperatures can be set during the plasma treatment over this roller according to film type or polymer. Afterwards the film is fed into the heating fields of the lateral stretching, where it is heated over suitable heating devices to the required lateral stretch temperature. After the width stretching in the lateral stretching frame the setting is carried out, if necessary in converging guidance of the frame. The fixed, biaxially-stretched, plasma-treated film is then subjected to a further surface treatment by means of corona or flame and finally coiled. Of course, according to the invention both surface treatments take place on the same film surface, i.e. the procedure according to the invention is not a two-sided surface treatment, but rather a twofold treatment of the same surface. In the corona or flame treatment, conventional intensities come into use, all treatment parameters can be varied in the conventional frame, so that the corona or flame treatment essentially corresponds in itself to a pre-treatment according to the prior art. However, surprisingly, very high values can be achieved before the lateral stretching through the upstream plasma treatment.

In a further possible embodiment, the film can, if necessary, additionally by treated on the side opposite the twice-treated (reverse side) in a known manner by means of flame or corona, as in some applications a film treated on the surface of both sides is desired. The surface treatment of the reverse side is carried out in the conventional manner by means of flame or corona after the longitudinal and lateral stretching, as well as after the heat setting, if necessary.

The principle of the twofold treatment according to the invention can also be put to use in a further embodiment of the invention in the manufacture of monoaxially-stretched film. In this connexion the said plasma treatment comes into use before the single stretch step and the additional corona or flame treatment is carried out on the same surface after the stretching. In this way, monoaxially-stretched films are manufactured which are treated on one surface initially with plasma and, after stretching, a second time conventionally. This procedural variant is particularly preferred for films stretched only in the longitudinal direction. In this connexion the plasma nozzles are located before the longitudinal stretching unit. The plasma-treated, longitudinally-stretched film is finally subjected to a further surface treatment on the surface already plasma-treated by means of flame or corona, and again after the heat setting if necessary.

Basically, in Corona treatment the sheet of film is fed over an electrically-earthed support surface, for example a roller, in a known manner. A counter electrode is arranged over this roller at a distance of a few millimeters from the roller. By the application of a mid-to-high frequency alternating current at high voltage, the electrons emitted by the counter electrode ionise the air in the gap between roller and counter electrode. The ions are accelerated through the electric filed in the direction of the roller electrode and release their charges and energy onto the film surface. As a result of this bombardment, the fragmentation reactions in the polymer surface like e.g. separations or chain scissions are initiated. Highly-reactive positions in the surface arise which can react with the reaction products of the corona discharge or rather with constituents of the surrounding atmosphere.

In flame treatment, the film is fed over a cooling roller, above which is arranged a gas burner. The gap between burner and film surface/cooling roller comes to a few mm and is chosen so that the oxidation reactions become maximal on the polymer surface. In the oxidation of the polymer surface there arise polar groups, through which the surface tension of the film is increased. A precondition for a flawless treatment of the film is an exact positioning of the sheet of film on the cooling roller and a constant cooling roller temperature.

The cooling roller temperature generally comes to <50° C. Details about flame treatment are described for example in "The base flame treatment process", H. Angeli/Fa. Esse Ci, $3^{rd}$ International Meeting on the Plastic Surface Treatment, 1989, Narni, Italy.

In a modified variation, the flame treatment is carried out with polaristion, as is described for example in "The polarized flame process", H. Lori/Fa. Esse Ci, $3^{rd}$ International Meeting on the Plastic Surface Treatment, 1989, Narni, Italy. In this method, the burner is arranged above the cooling roller. A DC voltage is thereby applied between the burner and the cooling roller, through which the ionised atoms in the flame obtain an increased acceleration and collide onto the polymer surface with larger kinetic energy. The thermal load of the polymer surface is smaller than in flame treatment without polarisation. At the same flame temperature, a higher surface tension is achieved in a procedure with polarisation than in a procedure without polarisation.

The plasma treatment procedure at atmospheric pressure is also known and described in the prior art. Treatments by means of an atmospheric pressure plasma, in which a plasma discharge is generated in a nozzle with gas throughflow, are particularly suitable for the plasma treatment of the longitudinally-stretched film before lateral stretching. These kinds of procedures for surface treatment as are described for example in DE 19532412 C2, to which explicit reference is made here.

The procedure according to the invention can be put to use for the raising of the surface tension of various films made of thermoplastic polymer. Of course, the polymers can contain conventional additives, like for example neutralisation agents, stabilisers or even substances which influence the optical characteristics of the film like e.g. colouring pigments, in particular titanium dioxide, or fillers which improve the mechanical rigidity as well as fillers which cause vacuolation in the polymer matrix during biaxial orientation. The films can be constructed in a single layer or in multiple layers. The procedure is particularly suitable for the surface treatment of films made of polyolefins like polyethylenes, polybutylenes or polypropylene or block, cork or static copolymerisates on the basis of polyethylene, polybutylene or polypropylene. Furthermore, the films can be made of polyester, e.g. PET, PBT, of polyurethane, ethylene vinyl acetate-mixed polymerisate, polyamide, polyether, polyvinyl ether and vinyl chloride-polymerisates. In multilayered films, the top layers to be treated are made up of the polymers previously described. These top layers can then be combined with further layers from the same or others polymers in a method known in itself. The polymers of the top layers are selected for the desired functionalities.

The procedure according to the invention is especially suitable for single-layered or multilayered polypropylene films, which are put to the most varied of uses, often as packaging films. Multilayered polypropylene films have top layers on one or both sides made of propylene copolymers, propylene terpolymers, polyethylene, polybutylenes, or made of mixtures of these polymers which lend the films the desired sealability or special optical characteristics. For highgloss films which preferably go to lamination or coating uses, top layers made of propylene homopolymers are preferred. Construction and composition, in particular also suitable additives for polypropylene films, are known in the prior art and described several times in detail in numerous patent specifications.

The isotactic propylene homopolymers which are placed in the treated film generally have a melting point of 140 to 170° C., preferably of 155 to 165° C., and a melt flow index (DIN measurement 53 735 at 21.6N load and 230° C.) of 1.0 to 10 g/10 min, preferably of 1.5 to 6.5 g/10 min. The n-heptane insoluble portion of the isotactic propylene homopolymers generally comes to 1 to 10% by weight, preferably 2.5% by weight relative to the output polymers.

The propylene co- or terpolymers previously named, which are introduced into the treated films, generally contain at least 80 to <100% by weight, preferably 90 to 99% by weight, propylene units. The corresponding comonomer content of up to 20% by weight or to 10% by weight generally consists of ethylene and/or butylene. The values in % by weight relate in each case to the propylene homopolymers.

Particularly suitable are static ethylene-propylene copolymers with an ethylene content of 1 to 10% by weight or static propylene-butylene copolymers with a butylene content of 2 to 25% by weight, in each case relative to the total weight of the copolymers, or static ethylene-propylene-butylene-1-terpolymers with an ethylene content of 1 to 10% by weight, and a butylene-1 content of 2 to 20% by weights in each case relative to the total weight of the terpolymer, or a blend of ethylene-propylene-butylene-1 terpolymers and propylene-butylene-1 copolymers, in which the blend features an ethylene content of 0.1 to 7% by weight, a propylene content of 50 to 90% by weight and a butylene-1 content of 10 to 40% by weight, in each case relative to the total weight of the polymer blend.

These co- and/or terpolymers generally feature a melt flow index of 1.5 to 30 g/10 min, preferably of 3 to 15 g/10 min. The melting point lies in the range from 120 to 140° C. The blend of co- and terpolymers has a melt flow index of 5 to 9 g/10 min and a melting point of 120 to 150° C. All previously given melt flow indices are measured at 230° C. and a force of 21.6 N (DIN 53 735).

If necessary, polyolefins, which are hydrophilised by the integration of maleic acid, can also be introduced into the treated top layer. The manufacture of this modified polypropylene is described for example in U.S. Pat. No. 3,433,777 and U.S. Pat. No. 4,198,327. The density of the modified polyolefins according to ASTM D 1505 preferably lies in a range from 0.89 to 0.92, the Vicat softening point according to ASTM 1525 lies in a range from 120 to 150° C., in particular 140 to 145° C., the Shore hardness according to ASTM 2240 comes to 55 to 70, preferably 67° C. and the melting point according to ASTM D 2117 lies in a range from 150 to 165° C., preferably 155 to 160° C. The maleic acid portion in modified polyolefins generally lies under 5% relative to the modified polyolefin, preferably in a range from 0.05 to 3%, in particular 0.1 to 1%. The melt flow index generally comes to 1 to 20 g/10 min, preferably 3 to 10 g/10 min.

The top layers of the film can additionally contain conventional additives like neutralisation agents, stabilisers, static inhibitors, anti-blocking agents and/or lubricants in effective quantities in each case. The thickness of the top layers can vary in the conventional ranges and generally lies between 0.5 and 5 μm.

The base layer of the multilayered polyolefin film is basically made up of the polyolefins previously described, among which the propylene homopolymers described are preferred, in particular isotactic propylene homopolymers. In general, the base layer contains at least 70 to 100, preferably 80 to <100% by weight polyolefins or propylene polymers. Moreover, in the base layer there are conventionally neutralisation agents and stabilisers, as well as further conventional additives in effective quantities, if necessary. For opaque or white-opaque embodiments of the film, the base layer additionally contains vacuolating fillers and/or pigments. Type and quantity of the fillers are known in the prior art.

If necessary, the film can feature single or double-sided intermediate layers as further layers. The intermediate layer(s) can consist of the polyolefins and, if necessary, contain conventional additives like static inhibitors, neutralisation agents, lubricants and/or stabilisers, as well as antiblocking agents if necessary. The thickness of the intermediate layer(s), if available, is larger than 0.3 mm and preferably lies in a range from 1.0 to 15 mm, in particular 1.5 to 10 mm.

The total thickness of the polyolefin film according to the invention can vary within further boundaries and conforms to the intended use. It preferably comes to 4 to 100 mm, in particular 5 to 90 mm, preferably 10 to 50 mm, whereby the base layer makes up around 40 to 100% of the total film thickness.

The combined pre-treatment according to the invention is integrated into the conventional manufacturing procedures for biaxially-oriented films known in themselves. These manufacturing procedures are different for different polymers of which the film could be made up. Basically, all procedures for manufacturing biaxially-oriented film comprise the steps of extrusion, pulling off, longitudinal stretching, plasma pre-treatment, lateral stretching, setting, corona or flame treatment and finally coiling. The procedure is subsequently described in detail with the example of the biaxially-oriented polypropylene film.

Within the scope of this procedure, the course of action is that the melts corresponding to the individual layers of the film are coextruded through a flat die, the film so obtained is pulled off on one or several roller(s) for hardening, the film is subsequently stretched (oriented), the stretched film is heat set.

The biaxial stretching (orientation) is carried out sequentially, such that in general stretching is carried out initially longitudinally (in the machine direction) and then laterally (at a right angle to the machine direction). Basically, the combined pre-treatment according to the invention can also be used in a simultaneous stretching procedure. In this embodiment, the plasma treatment is carried out before the simultaneously stretching of the film and the corona treatment after the setting of the stretched film. The further description of the film manufacture is carried out with the example of a flat film extrusion with subsequent sequential stretching.

Initially, as is conventional in extrusion procedures, the polymer or the polymer mixture of the individual layers is compressed in an extruder and liquefied, such that if necessary added additives can already by contained in the polymer or polymer mixture. The melts are then simultaneously pressed through a flat die (sheet die), and the single- or multilayered film is pulled off on one or several outfeed rollers, whereby it cools off and hardens. It has shown itself to be particularly advantageous for the outfeed roller or rollers by which the pressed-out film is cooled off and hardened to be held at a temperature of 10 to 100° C., preferably 20 to 50° C., by a heating and cooling circuit.

The film so obtained is then stretched longitudinally, which leads to an orientation of the molecular chains in the longitudinal direction. The longitudinal stretching is carried out advantageously with the help of two rollers running at different fast speeds corresponding to the desired stretch ratio. The longitudinal stretch ratios lie in the range from 4 to 8, preferably 5 to 6. In general, the longitudinal stretching is carried out at a temperature from 80 to 150° C. After the longitudinal stretching there takes place the much-described plasma pre-treatment, which is followed by the lateral (i.e. at right angles to the direction of extrusion) stretching. The lateral stretching takes place with the help of a clip frame, preferably at a temperature of 120 to 180° C. The lateral stretch ratios lie in the range from 5 to 10, preferably 7 to 9. Following the stretching of the film is its heat setting (heat treatment), such that the film is held around 0.1 to 10 s long at a temperature of 100 to 160° C. Depending on the desired mechanical properties, in particular shrinkage, the film is moved more or less converging during setting. Before the final coiling there takes place the corona or flame treatment in a known manner, according to the procedure previously described.

According to the invention, the polypropylene film so manufactured features a surface tension of over 48 mN/m, preferably 50 to 60 mN/m, immediately after manufacture.

The following measuring methods were used to characterise the raw materials and the films:

Melt Flow Index

The melt flow index was measured according to DIN 53 735 at 21.6N load and 230° C.

Melting Point

DSC measurement, maximum of the melt curve, heating speed 20° C./min.

Surface Tension

The surface tension was determined by means of the so-called ink method (DIN 53 364). In order to determine the durability of the pre-treatment, the surface tension was measured immediately after manufacture in defined periods of time (see Table 1) after manufacture.

The invention will now be described in more detail on the basis of exemplary embodiments:

Example 1

Combined Treatment on Copolymer Top Layer

By coextrusion and subsequent incremental orientation in the longitudinal and lateral direction, a transparent, three-layered film consisting of the base layer B and two-sided top layer A with a total thickness of 60 µm was manufactured. The top layers A each has a thickness of 1.0 µm. The layers were composed as follows:

Base Layer B:

~100% by weight propylene homopolymer with a melting point of 165° C. and a melt flow index of 3.4 g/10 min and chain isotaxy index of 94%.

Top Layers A and A1

~99.5% by weight static copolymer made of propylene-ethylene, with an ethylene content of 5% by eight relative to the copolymer. The melt flow index came to 6.0 g/10 min.

0.5% by weight anti-blocking agent with an average particle size of 4 µm.

All layers contained conventionally small quantities of stabilisers (e.g. Irganox 1010, Irgafox 168) and neutralisation agent (Ca stearate).

The manufacturing conditions in the individual procedural steps were:

Extrusion: Temperatures base layer B: 260° C.

Top layers A: 230° C.

Temperature of the outfeed roller: 20° C.

Longitudinal stretching: Temperature: 100° C.

Longitudinal stretch ratio: 1:4.5

Plasma treatment on one top layer A1
Lateral stretching: Temperature: 165° C.
Lateral stretch ratio: 1:9
Setting: Temperature: 140° C.
Convergence: 10%
Corona pre-treatment on the top layer A1 corona 10000V/10000 Hz The lateral stretch ratio of 1:9 is an effective value. This effective value is calculated from the end film width B, reduced by the two-fold seam strip width b divided by the width of the longitudinally-stretched film, likewise reduced about the two-fold seam strip width b.

The film so manufactured had a surface tension immediately after manufacture of approximately 56 mN/m on the surface of the top layer A1. The decline of the treatment is depicted in Table 1.

Example 2

Combined Treatment on Homopolymer Top Layer

A film as is described in example 1 was manufactured. In contrast to example 1, the top layer A1 was now made up of propylene homopolymer.

Top layer A1

~99.5% by weight propylene homopolymer with a melting point of 165° C. and a melt flow index of 3.4 g/10 min and a chain isotaxy index of 94%

0.5% by weight $SiO_2$ as anti-blocking agent with an average particle size of 4 μm The film so manufactured had a surface tension of 52-54 mN/m on the surface of the top layer A1 directly after manufacture. The decline of the treatment is depicted in Table 1.

Comparative Example 1

Only Corona on Copolymer Top Layer

A film, as described in example 1, was manufactured. In contrast to example 1, no plasma treatment was carried out before the lateral stretching. The composition of the film and the conventional manufacturing conditions were not changed.

The film so manufactured had a surface tension of approximately 44 mN/m on the surface of the top layer A1 immediately after manufacture. The decline of the treatment is depicted in Table 1.

Comparative Example 2

Only Corona on the Homopolymer Top Layer

A film, as described in example 2, was manufactured. In contrast to example 2, no plasma treatment was carried out before lateral stretching. The composition of the film and the conventional manufacturing conditions were not changed.

The film so manufactured had a surface tension of approximately 42-44 mN/m on the surface of the top layer A1 immediately after manufacture. The decline of the treatment is depicted in Table 1.

Comparative Example 3

Only Plasma on Copolymer Top Layer in Front of the Frame

A film, as described in example 1, was manufactured. In contrast to example 1, no corona treatment was carried out after the lateral stretching. The composition of the film and the conventional manufacturing conditions were not changed.

The film so manufactured had a surface tension of <34 mN/m on the surface of the treated top layer A1 immediately after manufacture. The surface treatment remains at a value of <34 mN/m.

Table 1:

TABLE 1

| Time [days] after treatment | Surface energy [mN/m] | | | | |
|---|---|---|---|---|---|
| | Example 1 | Example 2 | Comparative example 1 | Comparative example 2 | Comparative example 3 |
| 2 | 54-56 | 50-52 | 43-44 | 41-42 | 34 |
| 30 | 50-52 | 48-50 | 41-42 | 39-40 | ~34 |
| 90 | 48-49 | 48-49 | 40-41 | 38-40 | ~34 |
| 180 | ~48 | 46-48 | 40-41 | 37-39 | ~34 |
| 220 | ~48 | ~46 | 39-40 | ~38 | ~34 |

What is claimed is:

1. A method for raising the surface tension of monoaxially-stretched films made of polyolefin polymers which comprises
    stretching the polyolefin film monoaxially in the longitudinal direction,
    treating the longitudinally stretched film on one surface over its width by means of atmospheric pressure plasma,
    laterally stretching the treated film,
    subjecting the film before coiling to a second treatment by means of corona or flame, such that this second treatment is carried out in the same surface which has already been plasma treated and
    coiling the twice treated film,
    wherein the polyolefin is polyethylene, polybutylene, polypropylene, or mixtures of these polymers and
    wherein the film maintains a surface tension of at least 48 to 60 mN/m on the twice treated surface for a period of up to 3 months after its manufacture.

2. The method as claimed in claim 1, wherein the film is a single- or multilayered film.

3. The method as claimed in claim 1, wherein the film is a multilayered film made of a base layer and at least two top layers, and this base layer is made up predominantly of propylene homopolymer, and the top layers are made up of propylene homopolymer, propylene copolymer, propylene terpolymer, polyethylene, polybutylene, or of mixtures of these polymers.

4. A method for raising the surface tension of monoaxially-stretched films made of polyolefin polymers which consists essentially of
    stretching the polyolefin film monoaxially in the longitudinal direction,
    treating the longitudinally stretched film on one surface over its width by means of atmospheric pressure plasma,
    laterally stretching the treated film,
    subjecting the film before coiling to a second treatment by means of corona or flame, such that this second treatment is carried out in the same surface which has already been plasma treated and
    coiling the twice treated film,
    wherein the polyolefin is polyethylene, polybutylene, polypropylene or mixtures of these polymers and wherein the film maintains a surface tension of at least 48 to 60 mN/m on the twice treated surface for a period of up to 3 months after its manufacture.

5. The method as claimed in claim 4, wherein the film is a single- or multilayered film.

6. The method as claimed in claim 4, wherein the film is a multilayered film made of a base layer and at least two top layers, and this base layer is made up predominantly of propylene homopolymer, and the top layers are made up of propylene homopolymer, propylene copolymer, propylene terpolymer, polyethylene, polybutylene, or of mixtures of these polymers.

* * * * *